3,318,867
PROCESS FOR SEPARATING NITROGEN-BASIC MATERIALS FROM AQUEOUS SOLUTION
Heinz K. Jahnke, Kalamazoo, Mich., assignor to The Upjohn Company, Kalamazoo, Mich., a corporation of Delaware
No Drawing. Filed Aug. 20, 1964, Ser. No. 391,040
9 Claims. (Cl. 260—210)

This invention relates to a novel process for producing organic chemical compounds. In particular, this invention relates to a process for separating nitrogen-basic materials from aqueous solutions thereof. The process comprises the steps, (1) contacting the aqueous solution with a water-immiscible liquid cation exchanger, and (2) stripping the nitrogen-basic material from the loaded exchanger by contact with a mixture of water and an amine, an amine salt, or a quaternary ammonium salt.

Nitrogen-basic materials are those whose molecules each contain at least one trivalent nitrogen atom with an electron pair available for coordination with a proton. Some nitrogen-basic materials are amphoteric, being able to act as acids or bases depending on the environment. Nitrogen-basic materials can be of natural or synthetic origin. Examples are vitamins, alkaloids, amino acids, polypeptides, nitrogenous carbohydrates, nitrogenous dyestuffs and pigments, and the like, as well as materials obtained by in vitro or in vivo enzymatic or metabolic processes.

During production of a nitrogen-basic material, it is frequently necessary to separate the material from a relatively large volume of water. Prior art methods for doing that involve many techniques, including evaporation, distillation, lyophilization, precipitation in salt or complex form, adsorption, solvent extraction, contact with solid ion exchange resins, and the like. Among the disadvantages in using the various prior art separation techniques are inconvenience, expense, incomplete or inefficient separation, and loss of the desired material by partial destruction, isomerization, or other irreversible chemical change. Moreover, many of the prior art techniques are not adaptable to continuous operations.

I have now discovered that nitrogen-basic materials can be separated rapidly, efficiently, and economically from dilute aqueous solution by a unitary two-step process. The first step of said process comprises contacting said solution with a water-immiscible liquid cation exchanger comprising at least one water-immiscible organic diluent and at least one oil-soluble salt of an aromatic sulfonic acid, said acid having one to 2 aromatic rings and at least one alkyl moiety, there being in total at least 15 alkyl carbon atoms when the acid contains one aromatic ring and at least 8 alkyl carbon atoms when the acid contains 2 aromatic rings. Thereby, nitrogen-basic material in amount equivalent to the sulfonic acid salt passes rapidly to the organic diluent liquid phase. The second step of said process comprises contacting the loaded liquid cation exchanger resulting from the first step with a mixture of water and at least one stripping agent selected from the group consisting of amines, water-soluble acid addition salts thereof, and water-soluble quaternary ammonium salts, at a pH less than about 7. Thereby, the nitrogen-basic material passes rapidly from the organic diluent layer to the aqueous layer. The resulting aqueous solution can then be used directly as a convenient source of the nitrogen-basic material, or the nitrogen-basic material can be separated from the aqueous solution in free base form or as an acid addition salt by methods known in the art.

Although liquid ion exchangers are known in the art, e.g., Kunin et al., Angew. Chem. Intern. Ed. Engl., 1, 149–155 (1962), it was unexpected that the above-defined oil-soluble sulfonic acid salts would be useful in the separation of nitrogen-basic materials from aqueous solutions thereof. This is especially true in view of Kunin et al., supra, who state that currently available sulfonic acid compounds are so surface-active and so soluble as to be unsuitable for liquid cation exchange applications.

Further according to Kunin et al., supra, loaded liquid ion exchangers can generally be stripped by agents known in the art to be useful for stripping loaded solid ion exchangers. Although some of those prior art agents can be used to strip loaded liquid exchangers obtained according to this invention, those agents are surprisingly inefficient and otherwise unsatisfactory for that purpose. Unexpectedly, it was discovered that members of the above-defined particular and limited class of stripping agents in combination with water at a pH less than about 7 are highly efficient and otherwise suitable for removal of nitrogen-basic substances from loaded liquid exchangers obtained according to this invention. For reasons not completely understood, the specific liquid cation exchangers mentioned above coact with these specific stripping agents to give especially desirable results in the separation of nitrogen-basic materials from aqueous solutions.

Although the novel process of this invention is useful for separating a wide variety of nitrogen-basic materials from aqueous solutions thereof, said process is particularly useful when the nitrogen-basic material to be separated has a partition coefficient less than about 5 in an equal-volume mixture of the organic diluent of the liquid cation exchanger and water, wherein the term partition coefficient is defined as the concentration of solute in the organic diluent divided by the concentration of solute in water, concentrations being weight of solute per unit volume of solvent.

The novel process of this invention is especially useful in the separation of microbial metabolite from dilute aqueous solutions thereof. A microbial metabolite is a substance produced by a living microorganism, e.g., bacteria and fungi, usually in an aqueous medium containing sources of carbon and nitrogen, as well as various minerals, buffers, and the like. Many microbial metabolites are useful as antibiotics. Examples of nitrogen-basic antibiotic microbial metabolites which can be separated from aqueous solution by the novel process of this invention are actinospectacin, bacitracin, bluensomycin, celesticetin, chlorotetracycline, dihydrostreptomycin, erythromycin, gramicidin, kanamycin, lincomycin, neomycin, oleandomycin, oxytetracycline, polymyxin, streptomycin, streptothricin, tetracycline, tyrocidine, vancomycin, viomycin, and the like. Some of those nitrogen-basic antibiotics are amphoteric.

As is well known to those skilled in the art, crude beers obtained during production of a microbial metabolite usually contain numerous impurities and very small amounts of the desired metabolite. Accordingly, it is often expensive, time-consuming, and difficult, especially in large-scale operations, to isolate metabolites from such crude beers. In extraction processes, for example, the only suitable extractants are often those of relatively high solubility in the fermentation beer, so that serious emulsion problems are frequently encountered and solvent losses may be very high. In ion exchange techniques using solid resins, other ions in the beer often compete with the desired metabolite for the resin, and metabolite is frequently adsorbed so strongly on the resin that elution is difficult and seldom complete. If the isolation procedure requires a concentrated beer, large amounts of energy are required for the necessary water removal. These difficulties and others are avoided by use of the novel process of this invention to separate nitrogen-basic microbial metabolites from dilute aqueous beers.

As mentioned above, the water-immiscible liquid cation exchanger of the novel process of this invention comprises at least one water-immiscible organic diluent and at least one oil-soluble salt of an aromatic sulfonic acid. A water-immiscible diluent is one which forms a two-phase liquid system in contact with an equal volume of water. A wide variety of water-immiscible organic diluents and mixtures thereof can be used. In addition to water-immiscibility, an important criterion for the diluent is that it form a solution or a clear colloidal dispersion with the sulfonic acid salt. As will be apparent to those skilled in the art, however, most water-immiscible organic diluents will dissolve of form suitable clear dispersions with oil-soluble sulfonic acid salts. The diluent should, of course, be a liquid at the temperature and pressure within the vessel where contact is made with the aqueous solution. There is usually no reason for the diluent to have a high boiling point, i.e., above about 150°C, and there is sometimes disadvantages in that when it is desired to evaporate part or even all of the diluent from the diluent phase after contact with the aqueous solution. The diluent should also be relatively inert, i.e., should not undergo significant decomposition under the conditions of contact with the aqueous solution, and should not interact irreversibly with the sulfonic acid salt or the nitrogen-basic material which is to be separated.

Examples of suitable water-immiscible organic diluents for the novel process of this invention are the alkanes, i.e., pentane, hexane, heptane, octane, and the like, especially the commercially available mixtures of isomeric hexanes and heptanes; cycloalkanes, e.g., cyclohexane, methylcyclohexane, and the like; aromatic hydrocarbons, e.g., benzene, toluene, the xylenes, the trimethylbenzenes, ethylbenzene, cymene, cumene, tetrahydronaphthalene, and the like; halogenated hydrocarbons, e.g., dichloromethane, chloroform, carbon tetrachloride, 1,2-dichloroethane, 1,1,2,2-tetrachloroethane, chlorobenzene, dichlorobenzenes, and the like; ethers, e.g., diethyl ether, diisopropyl ether, and the like; esters, e.g., ethyl acetate, butyl acetate, methyl benzoate, and the like; and nitrocompounds, e.g., nitromethane, nitrobenzene, and the like. Dichloromethane is especially preferred as an organic diluent.

With regard to the oil-soluble salt of an aromatic sulfonic acid, the term "oil-soluble" is well-known to those skilled in the art. See, for example, Baker et al., Ind Eng. Chem., 46, 1035–42 (1954). "Oil" refers to normally liquid and mobile, petroleum-base hydrocarbon fractions. In the novel process of this invention, a sulfonic acid salt is considered "oil-soluble" if more than half of the salt remains in the oil phase when an oil solution is contacted with an equal volume of water. As is well known to those skilled in this art, oil "solutions" of these sulfonic acid salts are probably micellar rather than molecular in nature, and are thus probably colloidal dispersions rather than true solutions.

The cation portion of the oil-soluble sulfonic acid salt can be any of a large variety of metal cations. Alkali metal cations, e.g., sodium, potassium and ammonium ions, and alkaline earth metal cations, e.g., magnesium, calcium, and barium ions, are preferred, but other metal cations, e.g., aluminum, zinc, and copper ions, are also suitable.

The anion portion of the oil-soluble sulfonic acid salt can correspond to any of a large variety of aromatic sulfonic acids or mixtures thereof. The sulfo moiety should be attached directly to an aromatic ring and there should be one or two aromatic rings. When the acid contains one aromatic ring, there should be at least 15 alkyl carbon atoms attached to said ring, and preferably all 15 atoms should be present in a single alkyl moiety or in 2 alkyl moieties. When the acid contains 2 aromatic rings, there should be at least 8 alkyl carbon atoms attached to said rings, and preferably all 8 atoms should be present in a single alkyl moiety or in 2 alkyl moieties. In the case of 2-ring acids, the alkyl moieties can be attached to the same or to different rings, and the sulfo moiety can be in any position relative to the alkyl moieties. An "alkyl carbon atom" is defined as an atom which is attached only to other carbon atoms or to hydrogen atoms by single covalent bonds. The sulfonic acid can contain one or more alicyclic rings separate or fused with an aromatic ring. Also suitable are sulfonic acids with 2 unfused aromatic rings, e.g., as in biphenyl or diphenylmethane. Prefererd sulfonic acids are those obtained by sulfonation of mono- or polyalkylenebenzenes or naphthalenes. Such sulfonic acids and their oil-soluble salts are well-known to those skilled in the art and many are readily available from commercial sources. See, for example, U.S. Patents 2,620,353, 2,779,784, 2,802,866, 2,843,626, 2,861,951, 2,882,301, 2,889,460, 2,921,910, 3,007,868, 3,023,231, 3,031,497, 3,065,262, and 3,075,-005. As stock for sulfonation, it is especially preferred to use hydrocarbons obtained by monoalkylation or polyalkylation of benzene, toluene, the xylene, cumene, and naphthalene, or mixtures thereof with alkenes or alkyl halides derived either from petroleum fractions or by polymerization of lower alkenes.

Although monocyclic sulfonic acids with 15 alkyl carbon atoms and bicyclic acids with 8 alkyl carbon atoms are operable in the novel process of this invention provided that the salt used is oil-soluble as defined above, it is preferred to use monocyclic acids with about 18 to about 30 alkyl carbon atoms or bicyclic acids with about 12 to about 24 alkyl carbon atoms, the alkyl carbon atoms preferably being present as one or 2 branched-chain alkyl moieties. When sulfonic acids with fewer alkyl carbon atoms are used, the tendency toward emulsion formation during contact with aqueous solutions increases, and the necessary separation of aqueous and exchanger phases tends to be slower. There is usually no reason to use a sulfonic acid with more alkyl carbon atoms than the preferred upper limits. Moreover, there may be economic disadvantages in doing so because as the equivalent weight of the sulfonic acid increases, a larger weight of the acid must be used to effect the desired separation. Particularly preferred are the alkali metal, ammonium, and alkaline earth metal salts of dinonylnaphthalenesulfonic acid, e.g., those described in U.S. Patent 2,764,548.

The first step of the novel process of this invention is carried out by contacting the aqueous solution of the nitrogen-basic material whose separation is desired with the solution or dispersion of oil-soluble sulfonic acid salt in water-immiscible organic diluent. Although the pH of said aqueous solution is not critical, it is preferred to maintain pH in the range about 4 to about 10. In the case of nitrogen-basic microbial metabolites, optimum results are usually obtained in the pH range about 6 to about 8. Since sulfonic acids will exist largely in anionic form in the preferred pH range, it is not necessary that the sulfonic acid be present initially in the organic diluent as a salt because contact with the aqueous solution in the pH range about 4 to about 10 will transform the sulfonic acid largely to said anionic form. In that event, of course, it will be necessary that the aqueous solution be sufficiently buffered or that sufficient base be added so that the aqueous solution continues to remain within said preferred pH range.

Contact between aqueous solution and liquid cation exchanger can be made by any batch or continuous method known to the art to be useful for liquid-liquid extraction. Examples of suitable equipment types include mixer-setter systems, column contactors, and centrifugal contactors. See, for example, Kunin et al., supra. In order to separate the maximum amount of desired nitrogen-basic material from its aqueous solution, each equivalent of nitrogen-basic material should be contacted with at least one equivalent of sulfonic acid salt. Thus the total volume of cation exchanger used to contact a particular volume of aqueous solution should contain at least an amount of sulfonic acid salt equivalent to the amount of nitrogen-basic material desired to be extracted from that volume of aqueous solution. It is often advantageous to use a small to moderate excess of sulfonic acid salt, for example about 1.5 to about 4 equivalents of sulfonic acid salt per equivalent of nitrogen-basic material, to ensure that all portions of the aqueous solution are contacted with unexchanged sulfonic acid salt. If it is desired to concentrate the desired nitrogen-basic material into a smaller volume as well as to separate the material from aqueous solution, for example, as a step toward isolation of the nitrogen-basic material in pure form, it is advantageous to use an appropriately higher concentration of sulfonic acid salt in organic diluent. For example, 10 gallons of a 1 normal sulfonic acid salt solution could be used to remove nitrogen-basic material from 100 gallons of a 0.1 normal aqueous solution of the latter, thereby effecting not only a separation but also a concentration. Usually it is preferred to use a liquid ion exchanger which contains a maximum of about 10 percent by weight of sulfonic acid salt. A greater concentration can be used but then there is a greater tendency to form emulsions or additional liquid or solid phases during the contacting operations. The nitrogen-basic material can also be concentrated after cation exchange by evaporation or distillation of the loaded liquid cation exchanger.

Dilute aqueous solutions of nitrogen-basic materials often contain non-nitrogenous materials which are soluble in and extractable with the water-immiscible organic diluent present in the liquid cation exchanger. That is especially true when the aqueous solution is obtained by extraction of animal or plant material, or when it is obtained by enzymatic or metabolic processes, for example, by action of a microorganism on a nutrient medium. If it is desired that such materials not be present in the exchanger with the nitrogen-basic materials after separation of the latter according to the first step of the novel process of this invention, it is advantageous to subject said aqueous solution to a preliminary extraction with the same organic diluent present in the cation exchanger. Further, it is often advantageous to subject the liquid cation exchanger to a preliminary equilibration with an aqueous solution of pH and buffering capacity similar to that of the aqueous solution containing the nitrogen-basic material subsequently to be separated.

As mentioned above, the second step of the novel process of this invention comprises contacting the liquid cation exchanger, loaded with nitrogen-basic material as described herein above, with a mixture of water and at least one stripping agent selected from the group consisting of amines, water-soluble acid addition salts thereof, and water-soluble quaternary ammonium salts. The pH of the aqueous layer which results from such contact should be maintained during contact at a pH less than about 7. Especially satisfactory results are usually obtained in the pH range about 2 to about 5. When this procedure is followed, the nitrogen-basic material passes rapidly and, in most cases, substantially completely from the water-immiscible cation exchanger to the aqueous layer. If it is desired that all nitrogen-basic material in the cation exchanger be stripped therefrom, at least one equivalent of stripping agent should be used for each equivalent of nitrogen-basic material to be stripped. It is often advantageous to use a small to moderate excess of stripping agent, for example about 1.1 to about 1.5 equivalents of stripping agent per equivalent of nitrogen-basic material, to ensure that all portions of the loaded exchanger are contacted with stripping agent. Moreover, amines differ somewhat in their striping efficiency, and it is advantageous to use an amount of amine appropriate to its efficiency. A concentration of the desired nitrogen-basic material can also be obtained by using a relatively higher concentration of the stripping agent.

It is preferred that amines used as stripping agents be sufficiently basic to form water-soluble acid addition salts. Such amines usually exhibit $pK_b$ less than about 11. Water-soluble amines of relatively low molecular weight, for example, below about 60 to about 75, tend in some instances to be less efficient as stripping agents than amines of higher molecular weight. However, that lesser efficiency tends to be balanced by a smaller equivalent weight, so that low-molecular weight amines are economically useful in the novel process of this invention. Examples of amines suitable to strip nitrogen-basic materials from water-immiscible cation exchangers of the type described above are methylamine, ethylamine, dimethylamine, propylamine, isopropylamine, trimethylamine, butylamine, isobutylamine, dipropylamine, pentylamine, hexylamine, triethylamine, dimethylhexylamine, heptylamine, octylamine, ethylhexylamine, nonylamine, decylamine, dodecylamine, tetradecylamine, allylamine, oleylamine, cyclohexylamine, benzylamine aniline, N-ethylaniline, N,N-dimethylaniline, N,N-diethylaniline, o-chloroaniline, o-toluidine, piperidine, pyrrolidine, morpholine, pyridine, the picolines, quinoline, isoquinolne, and the like. Although substantially any amine can be used, it is preferred for ease of operation that the amine be a liquid at the contacting temperature, that it be sufficiently soluble in the loaded cation exchanger to form a clear solution therewith, and that it have a partition coefficient at least 1 and preferably at least 5 in an equal-volume mixture of the organic diluent of the liquid cation exchanger and water, wherein the term partition coefficient is as defined above. In most instances, the cost and availability of the amine will be an important consideration.

As will be apparent to those skilled in the art, the most suitable amines and their efficiency for a particular stripping application can readily and rapidly be determined by small scale test extractions of aliquots of a loaded cation exchanger.

In carrying out the actual stripping operation, the loaded cation exchanger, the amine, and water can be mixed in any order. Sufficient acid or buffer to give the desired pH can be added to the water before or after admixture with the cation exchanger and/or the amine. The two resulting liquid phases are mixed and separated by conventional techniques. This stripping process can be carried out in batches or continuously in conventional apparatus as discussed above for contact of cation exchanger and original aqueous solution of nitrogan-basic material.

Water-soluble acid addition salts of amines can be used in place of the free amines. Suitable salts for that purpose include acid addition salts of the above-listed amines. Suitable acids for such salts include hydrochloric, hydrobromic, sulfuric, nitric, phosphoric, acetic, salicylic, succinic, and like acids. Water-soluble quaternary ammonium salts can also be used in place of free amines. Examples of the amonium cation of such salts are tetramethylammonium, tetraethylammonium, phenyltrimethylammonium, benzyltrimethylammonium, tricaprylmethylammonium, octodecyltrimethylammonium, 1-hexadecylpyridinium, benzyldimethylphenylammonium and the like. Examples of suitable anions for these quaternary salts are chloride, bromide, iodide, sulfate, nitrate, and the like. When water-soluble acid addition salts or quaternary ammonium salts are used in place of amines, less acid is usually required to maintain the pH of the aqueous phase below about 7.

After stripping of the loaded cation exchanger, it is advantageous to wash the resulting aqueous solution with some of the same water-immiscible diluent used in the cation exchanger. It is also often advantageous to wash the stripped liquid cation exchanger one or more times with portions of water to insure complete separation of the desired nitrogen-basic material. Those water washings should be added to the aqueous stripping extract.

The final aqueous solution of nitrogen-basic material usually contains the latter in salt form. If desired, said nitrogen-basic solution can be isolated in salt form or as the free base by conventional techniques, for example, by evaporation or by raising the pH of the solution until the nitrogen-basic material is present in free base form followed by extraction with a water-immiscible solvent, e.g., dichloromethane, chloroform, or hexane. At this stage, the most suitable isolation procedure for a specific nitrogen-basic material will be apparent to those skilled in the art, and said procedure is not part of the novel process of this invention.

The invention can be more fully understood by the following examples.

*Example 1.—Separation of lincomycin*

A filtered fermentation broth (1600 l.) containing 795 mcg. of lincomycin per ml. was prepared according to U.S. Patent 3,086,912. The broth was adjusted to pH 8 with sodium hydroxide and contacted in a centrifugal countercurrent extractor (Podbielniak) with 350 l. of dichloromethane containing 2% by weight of sodium dinonylnaphthalenesulfonate (U.S. Patent 2,764,548). The broth contained about 10 mcg. of lincomycin per ml. after that extraction.

The resulting dichloromethane solution (loaded cation exchanger) was evaporated to 30 l. Octylamine (2.2 l.) and water (5 l.) were added, and the mixture was agitated and adjusted to pH 3 with 1200 ml. of concentrated hydrochloric acid. Further agitation for about 5 minutes gave 2 liquid layers which were separated. The dichloromethane layer was extracted four times with 5-l. portions of water. The aqueous layer and the water extracts were then combined, filtered to remove a small amount of insoluble material, and evaporated at reduced pressure to about 5 l. The resulting solution was adjusted to pH 10 with 50% aqueous sodium hydroxide solution, and was then extracted 3 times with 3-l. portions of dichloromethane. The combined dichloromethane extracts were evaporated, and the residue was dissolved in about 10 l. of acetone containing 5% by weight of water. Lincomycin hydrochloride (1063 g.) crystallized from that solution after adjusting to pH 3 with concentrated hydrochloric acid.

*Example 2.—Separation of lincomycin*

An aqueous solution (20 ml.) containing 2 g. of lincomycin hydrochloride monohydrate was shaken with a dichloromethane solution (20 ml.) containing 2 g. of sodium dibutylnaphthalenesulfonate. The two liquid phases were separated by centrifugation. The optical rotation of the aqueous layer indicated that 96% of the lincomycin had been extracted therefrom.

The above procedure was repeated, using dichloromethane solutions of sodium salts of alkylated benzenesulfonic acids with the following equivalent weights: 425, 465, 475, 483, and 495. The percentages of lincomycin extracted from the aqueous solution were 83, 83, 83, 85, and 79, respectively.

Following the above procedure but using potassium, calcium, magnesium, barium, and zinc salts of dinonylnaphthalenesulfonic acid (U.S. Patent 2,764,548), similar amounts of lincomycin are extracted from the aqueous solutions.

*Example 3.—Separation of lincomycin*

An aqueous solution containing 5% by weight of lincomycin hydrochloride monohydrate was prepared. The optical rotation of that solution was 6.56°. Aliquots of that solution were shaken with equal volumes of various cation exchangers, each consisting of an organic diluent and 10% by weight of sodium dinonylnaphthalenesulfonate. In each case, the liquid phases were separated and the optical rotation of the aqueous phase was measured to indicate the relative amount of lincomycin which had been removed by the ion exchanger. The organic diluent and corresponding aqueous phase optical rotation were: diethyl ether, 0.22°; chloroform, 0.00°; dichloromethane, 0.00°; ethyl acetate, 0.35°; butyl acetate, 0.23°; nitrobenzene, 0.04°; a mixture of hexane isomers (Skellysolve B), 0.20°.

*Example 4.—Stripping of lincomycin*

A cation exchanger consisting of dichloromethane containing 20% by weight of sodium dinonylnaphthalenesulfonate was loaded with lincomycin by shaking with an aqueous solution of the hydrochloride thereof. 20-ml. portions of the loaded exchanger were then shaken with one of the following stripping agents: a solution of equal volumes of methanol and water brought to pH 12 with sodium hydroxide; a solution of equal volumes of methanol and water brought to pH 1 with sulfuric acid; a solution of 1 volume of methanol and 3 volumes of water containing 5% by weight of sodium chloride; a solution of equal volumes of methanol and water containing 5% by weight of sodium chloride. The percentages of lincomycin stripped from the exchanger were 11, 15, 10, and 26, respectively.

The above procedure was repeated, using as stripping agents: 2 ml. of octylamine, 4 ml. of oleylamine, and 4 ml. of a solution of tricaprylmethylammonium chloride (about 90% by weight; Aliquat 336). In each instance, the stripping agent was added to the loaded cation exchanger, after which there was added about 10 ml. of water and enough concentrated hydrochloric acid to give a pH about 3. After shaking and phase separation, it was determined that substantially 100% of the lincomycin had been stripped from the loaded cation exchanger.

*Example 5.—Stripping of lincomycin*

A cation exchanger consisting of dichloromethane containing 20% by weight of sodium dinonylnaphthalenesulfonate was loaded with lincomycin. Equivalent amounts of the following amines were added to 20-ml. portions of the loaded exchanger: methylamine, ethylamine, propylamine, butylamine, amylamine, hexylamine, dipropylamine, triethylamine, octylamine, dibutylamine, 2-ethylhexylamine, decylamine, cyclohexylamine, piperidine, morpholine, aniline, dimethylaniline, pyridine, and ethylenediamine. Each portion was then extracted with an equal volume of water at pH 4. The percentages of lincomycin stripped from the exchanger were: 11, 16, 32, 45, 51, 63.5 (average of 2), 74, 63, 87 (average of 3), 92, 88, 99, 88, 79, 42, 82, 76, 42, and 19, respectively.

*Example 6.—Separation of actinospectacin*

An aqueous solution containing 5 g. of actinospectacin sulfate in 100 ml. of water was extracted with two 50-ml. portions of a cation exchanger consisting of dichloromethane containing 10% by weight of sodium dinonylnaphthalenesulfonate. A mixture of octylamine (7 ml.) and water (20 ml.) was added to the combined exchanger layers, and the resulting mixture was shaken and adjusted to pH 4 with concentrated sulfuric acid. The aqueous phase which resulted was separated and evaporated under reduced pressure to 10 ml. That solution was then warmed and diluted with 10 ml. of acetone. Actinospectacin sulfate (5 g.) crystallized from the mixture.

Actinospectacin is a microbial metabolite produced by controlled fermentation with *Streptomyces spectabilis*. See Antibiot. Chemotherapy, 11, 118 (1961); ibid. 11, 661 (1961); Union of South Africa Patent No. 60/4098; Belgium Patent No. 596,175, Canada Patent No. 683,292.

*Example 7.—Separation of neomycin*

An aqueous solution (1000 ml.) containing 5 g. of neomycin sulfate was extracted with two 300-ml. portions of dichloromethane containing 10% by weight of sodium dinonylnaphthalenesufonate. A mixture of oleylamine (30 ml.) and water (50 ml.) was added to the combined exchanger layers, and the resulting mixture was shaken and adjusted to pH 4 with concentrated sulfuric acid.

The resulting aqueous layer contained 95% of the original amount of neomycin.

Example 8.—Separation of L-arginine

An aqueous solution containing 1 g. of L-arginine hydrochloride dissolved in 100 ml. of water at pH 5 (optical rotation 0.034°) was extracted with 5 g. of dinonylnaphthalenesulfonic acid in 50 ml. of dichloromethane. The optical rotation of the extracted aqueous solution indicated the presence there of about 5% of the L-arginine originally present.

A mixture of octylamine (2.5 ml.) and water (50 ml.) was added to the loaded exchanger layer, and the resulting mixture was shaken and adjusted to pH 2. The optical rotation of the resulting aqueous layer (0.079°) indicated quantitative recovery of L-arginine from the exchanger.

Example 9.—Separation of L-lysine

Following the procedure of Example 8, 79% of the L-lysine in an aqueous solution was extracted by the ion exchanger. Subsequent stripping of L-lysine from the loaded exchanger was quantitative.

Example 10.—Separation of L-leucine

Following the procedure of Example 8, 44% of the L-leucine in an aqueous solution was extracted by the ion exchanger. Subsequent stripping of L-leucine from the loaded exchanger was quantitative.

Example 11.—Separation of L-glutamic acid

Following the procedure of Example 8, 22% of the L-glutamic acid in an aqueous solution was extracted by the ion exchanger. Subsequent stripping of L-glutamic acid from the loaded exchanger was quantitative.

Example 12.—Separation of quinidine

An aqueous solution containing 1 g. of quinidine sulfate in 100 ml. of water at pH 5 ($\alpha_D$=1.94°) was extracted with 20 ml. of a 10% solution of dinonylnaphthalenesulfonic acid in an equal volume mixture of ethyl acetate and hexane (Skellysolve B). The optical rotation of the extracted aqueous solution was 0.02°.

Octylamine (1 ml.) and water (20 ml.) were added to the loaded exchanger layer, and the resulting mixture was shaken and adjusted to pH 2. The optical rotation ($\alpha_D$) of the resulting aqueous layer (22 ml.) was 10.83°.

Example 13.—Separation of pyridoxine

An aqueous solution containing 1 g. of pyridoxine hydrochloride in 100 ml. of water (absorbance at pH 7 and 327 m$\mu$=345) was extracted with 8 g. of dinonylnaphthalenesulfonic acid in 80 ml. of dichloromethane. The absorbance of the extracted aqueous solution (30 at 327 m$\mu$) indicated extraction of about 91% of the pyridoxine originally present.

Octylamine (4 ml.) and water (50 ml.) were added to the loaded exchanger layer, and the resulting mixture was shaken and adjusted to pH 2. The absorbance (555 at 372 m$\mu$) of the resulting aqueous layer (55 ml.) indicated 96% recovery of pyridoxine from the exchanger.

I claim:

1. A process for separating a nitrogen-basic material from an aqueous solution thereof which comprises the steps, (1) contacting said aqueous solution with a water-immiscible liquid cation exchanger comprising at least one water-immiscible organic diluent with boiling point less than 150° C. and at least one oil-soluble salt of an aromatic sulfonic acid, said acid having one to 2 aromatic rings and at least one alkyl moiety, there being in total at least 15 alkyl carbon atoms when the acid contains one aromatic ring and at least 8 alkyl carbon atoms when the acid contains 2 aromatic rings, and (2) contacting the organic diluent phase resulting from step (1) with a mixture of water and at least one stripping agent selected from the group consisting of amines with p$K_b$ less than 11, water-soluble acid addition salts thereof, and water-soluble quaternary ammonium salts, at a pH less than about 7.

2. A process for separating a nitrogen-basic material from an aqueous solution thereof which comprises the steps, (1) contacting said aqueous solution in the pH range about 4 to about 10 with a lesser volume of a water-immiscible liquid cation exchanger comprising at least one water-immiscible organic diluent with boiling point less than 150° C. and at least one oil-soluble salt of an aromatic sulfonic acid, the cation of said salt being selected from the group consisting of alkali metal, ammonium, and alkaline earth metal cations, and the anion of said salt being selected from the group consisting of mono- and polyalkylsulfonic acid anions with a total of at least 15 alkyl carbon atoms, and mono- and polyalkylnaphthalenesulfonic acid anions with a total of at least 8 alkyl carbon atoms, the total amount of said salt being at least equivalent to the amount of nitrogen-basic material in said aqueous solution, and (2) contacting the organic diluent phase resulting from step (1) with a mixture of water and at least one stripping agent selected from the group consisting of amines with p$K_b$ less than 11, water-soluble acid addition salts thereof, and water-soluble quaternary ammonium salts, in the pH range about 2 to about 5, the total amount of said stripping agent being at least equivalent to the amount of nitrogen-basic material.

3. The process of claim 2 wherein said stripping agent is an amine with a partition coefficient at least one in an equal-volume mixture of the organic diluent of the liquid cation exchanger and water.

4. The process of claim 2 wherein said nitrogen-basic material is a microbial metabolite.

5. The process of claim 4 wherein said aromatic sulfonic acid is dinonylnaphthalenesulfonic acid.

6. The process of claim 5 wherein said nitrogen-basic microbial metabolite is lincomycin.

7. The process of claim 5 wherein said nitrogen-basic microbial metabolite is actinospectacin.

8. The process of claim 5 wherein said nitrogen-basic microbial metabolite is neomycin.

9. A process for producing a nitrogen-basic microbial metabolite which comprises the steps, (1) producing a crude beer containing said metabolite by the action of a microorganism in an aqueous medium containing sources of carbon and nitrogen, (2) contacting said beer with a water-immiscible liquid cation exchanger comprising at least one water-immiscible organic diluent with boiling point less than 150° C. and at least one oil-soluble salt of an aromatic sulfonic acid, said acid having one to 2 aromatic rings and at least one alkyl moiety, there being in total at least 15 alkyl carbon atoms when the acid contains one aromatic ring and at least 8 alkyl carbon atoms when the acid contains 2 aromatic rings, and (3) contacting the organic diluent phase resulting from step (2) with a mixture of water and at least one stripping agent selected from the group consisting of amines with p$K_b$ less than 11, water-soluble acid addition salts thereof, and water-soluble quaternary ammonium salts, at a pH less than about 7.

References Cited by the Examiner

UNITED STATES PATENTS

| | | | |
|---|---|---|---|
| 2,667,441 | 1/1954 | Nager | 260—210 |
| 2,698,821 | 1/1955 | Wehrmeister | 260—210 |
| 3,086,912 | 4/1963 | Bergy et al. | 260—210 |

LEWIS GOTTS, *Primary Examiner.*

JOHNNIE R. BROWN, *Assistant Examiner.*